United States Patent

[11] 3,601,871

[72] Inventor Joe T. Pierce
Richardson, Tex.
[21] Appl. No. 763,817
[22] Filed Sept. 30, 1968
[45] Patented Aug. 31, 1971
[73] Assignee Texas Instruments Incorporated
Dallas, Tex.

[54] METHOD FOR FABRICATING MAGNETIC READ-WRITE HEAD ARRAY AND PRODUCT

5 Claims, 29 Drawing Figs.

[52] U.S. Cl. .......... 29/603, 29/411, 29/425, 156/264, 179/100.2 C
[51] Int. Cl. .......... H01f 7/06
[50] Field of Search .......... 29/603, 425, 411; 179/100.2 C; 340/174.1 F; 346/74 MC; 156/264, 260

[56] References Cited

UNITED STATES PATENTS

| | | | |
|---|---|---|---|
| 1,588,797 | 6/1926 | Mell | 156/264 X |
| 3,187,410 | 6/1965 | Duinker et al. | 29/603 |
| 3,195,119 | 7/1965 | Worosz | 340/174.1 |
| 3,353,261 | 11/1967 | Bradford et al. | 29/603 |
| 3,458,926 | 8/1969 | Maissel et al. | 29/603 |
| 3,478,340 | 11/1969 | Schwartz et al. | 29/603 X |

*Primary Examiner*—John F. Campbell
*Assistant Examiner*—Carl E. Hall
*Attorneys*—Samuel M. Mims, Jr., James O. Dixon, Andrew M. Hassell, Harold Levine, Rene' E. Grossman, Melvin Sharp and Richards, Harris & Hubbard

ABSTRACT: A method for fabricating an array of read-write heads for a magnetic storage means, such as a disk or drum, is disclosed. Each head is comprised of a flux-carrying means, such as a gapped magnetic loop inductively coupled to a flux-producing means, such as a pair of coils. The coils, together with a portion of the associated addressing circuitry, are formed on a high resistivity substrate. The halves of the magnetic loops that lie on opposite sides of the coil assembly are fabricated in the relative position on two separate assemblies. The two assemblies are then bonded to opposite sides of the coil assembly so that the halves of the magnetic loops mate through holes in the substrate to form the complete gapped magnetic loops. The excess material of the assemblies is then cut away as required to leave magnetically isolated magnetic loops and the associated coils embedded within a solid body.

The sensing gaps of the magnetic loops are formed by vacuum depositing a thin layer of nonmagnetic material on a face of one ferrite part, disposing a second ferrite part against the thin nonmagnetic layer and bonding the two ferrite parts together, taking a section of two ferrite parts normal to the nonmagnetic layer, and bridging the nonmagnetic layer with a third ferrite part to complete the magnetic loop.

The loop assemblies may be formed by cutting grooves in the faces of ferrite blocks to form a number of ferrite mesas corresponding to the number of read-write heads. The grooves are then filled with a nonmagnetic material to magnetically isolate the ferrite mesas. The loop assemblies are then bonded to opposite sides of the coil assembly before being separated from the ferrite block. Alternatively, the ferrite assembly may be formed by laminating a layer of ferrite material, or two layers of ferrite material separated by a thin layer of nonmagnetic material for forming a sensing gap, between two layers of nonmagnetic material, slicing the layers in a plane normal to the layers to produce a number of slices each having a strip of ferrite disposed between strips of nonmagnetic material, then laminating these slices such that each strip of ferrite is isolated by nonmagnetic material. This laminated structure is again sliced normal to the last laminating joints to produce slices having individually isolated ferrite islands extending normal to the slice. Each ferrite island is then incorporated into a magnetic loop.

METHOD FOR FABRICATING MAGNETIC READ-WRITE HEAD ARRAY AND PRODUCT

This invention relates generally to magnetic data storage, and more particularly relates to arrays of magnetic read-write heads used in data processing to write on and read from magnetic disk and magnetic drum memories.

Magnetic disk and magnetic drum memories are used extensively in computers because of their reasonable cost and high access rates. Two basic types of read-write systems are used in connection with these memories. In one, a separate read-write head is provided for each data track. This has the advantage of reducing the maximum access time to one revolution of the disk or drum, but has the disadvantage of requiring a very large number of heads. The other type provides a single read-write head for a number of tracks and moves the head by means of a digital or analog positioning mechanism. This system has the slower access time, which is basically the sum of the maximum head positioning time and the disk revolution time. Most large disk memories utilize a movable head system because the principle difference in cost between the two systems is the cost of the individual magnetic heads.

In order to achieve maximum storage, the fixed magnetic heads must be very small, thus making their manufacture relatively expensive. For example, it is necessary to have as many as 16 magnetic heads per linear inch, and even then two or more staggered rows are required to achieve maximum storage capacity. For optimum operation, the heads must be located very close to the recording medium. The arrays of heads are customarily supported about 100 microinches above the recording media by an air film upon which the array floats. The array and recording media must, therefore, be essentially optically flat over the width of the array and may have a length of about 1 inch.

The current procedure for fabricating these arrays involves grinding individual gapped ferrite loops, then winding very small wires around each leg of each loop to form a pair of coils. The head assemblies are then positioned in a holder machined from a nonmagnetic material and bonded in place, while maintaining the many lead wires to the individual coils under control. The face of the array is then ground and lapped, and finally the lead wires are connected to the appropriate addressing circuitry. Because of the very small size and individual handling required, the cost of this procedure is relatively high and has been a primary limiting factor in the use of read-write systems having an individual pickup head for each track on the storage media. The nonmagnetic gaps in the ferrite loops are typically on the order of 25,000 angstroms in width. It is important that the width of the gaps be maintained at a predetermined value in order for the read-write head to have the specified operating characteristics.

This invention is concerned with a method for fabricating an array of read-write heads which makes systems using a separate read-write head for each data track comparable in cost to the much slower indexing type system, and with the resulting array of read-write heads.

In accordance with one aspect of this invention, the sensing gap in the magnetic loop of a read-write head is fabricated by depositing a thin layer of nonmagnetic material on one face of at least one ferrite part, disposing a second ferrite part adjacent said ferrite part such that the layer of nonmagnetic material separates the two ferrite parts to form the sensing gap, and then completing the magnetic loop with a third ferrite part bridging the gap.

In accordance with another aspect of the invention, the first and second parts, together with the sensing gaps therebetween, are simultaneously fabricated on a lower assembly in the same relative positions as the parts ultimately occupy in the array by cutting grooves in the face of a ferrite block and filling the grooves with nonmagnetic material. The third parts are similarly formed on the face of an upper assembly. The two assemblies are then bonded together on opposite sides of a coil array to complete the magnetic loops and the excess ferrite material removed to leave individual, magnetically isolated magnetic loops within a solid body.

In accordance with another aspect of the invention, the lower assembly is formed by laminating a pair of sheets of ferrite material separated by a thin sheet of nonmagnetic material between two thick sheets of nonmagnetic material. The laminated structure is then sliced normal to the laminated sheets to form a set of slices which are then relaminated in a manner to provide magnetically isolated ferrite bodies disposed in the same relative positions within the array as the read-write heads and each adapted to form the first and second ferrite parts of the individual magnetic loops. The upper assembly is fabricated in the same manner, except that only one ferrite sheet is used in the original laminate. The two assemblies are then joined on opposite sides of a coil assembly to complete the array of read-write heads.

The novel features believed characteristic of this invention are set forth in the appended claims. The invention itself, however, as well as other objects and advantages thereof, may best be understood by reference to the following detailed description of illustrative embodiments, when read in conjunction with the accompanying drawings, wherein:

Figure 1:
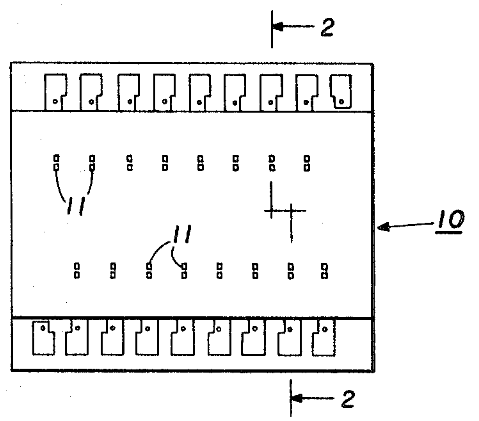
FIG. 1 is a bottom view of an array of read-write heads constructed in accordance with the present invention.

Referring now to the drawings, and in particular to FIG. 1, an array of read-write heads fabricated in accordance with the present invention is indicated generally by the reference numeral 10. In the embodiment illustrated, 16 heads 11 are arrayed in two staggered rows, eight in each row, as can be seen in the bottom view of FIG. 1, although other numbers of heads may be utilized as desired.

Figure 2:
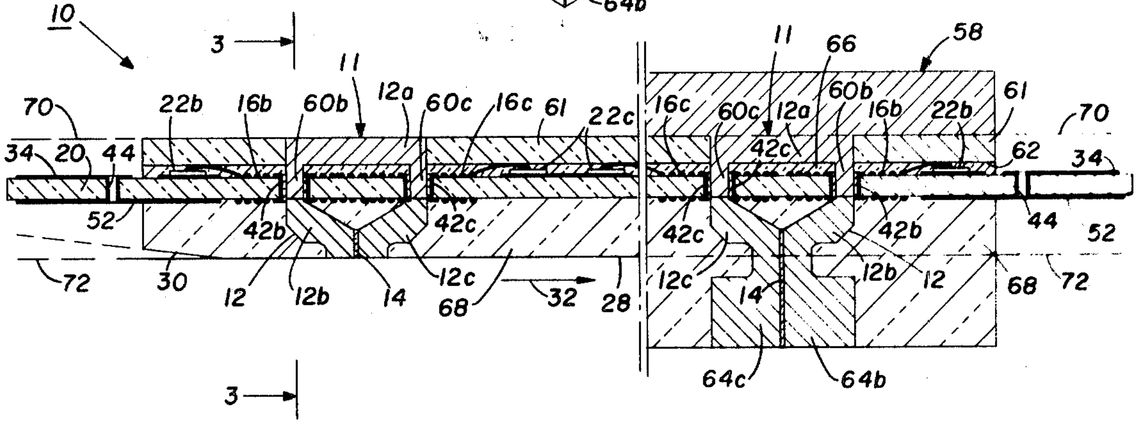
FIG. 2 is a sectional view taken generally on lines 2—2 of FIG. 1, the right-hand portion of the drawing being shown in an intermediate stage of completion.
Figure 3:
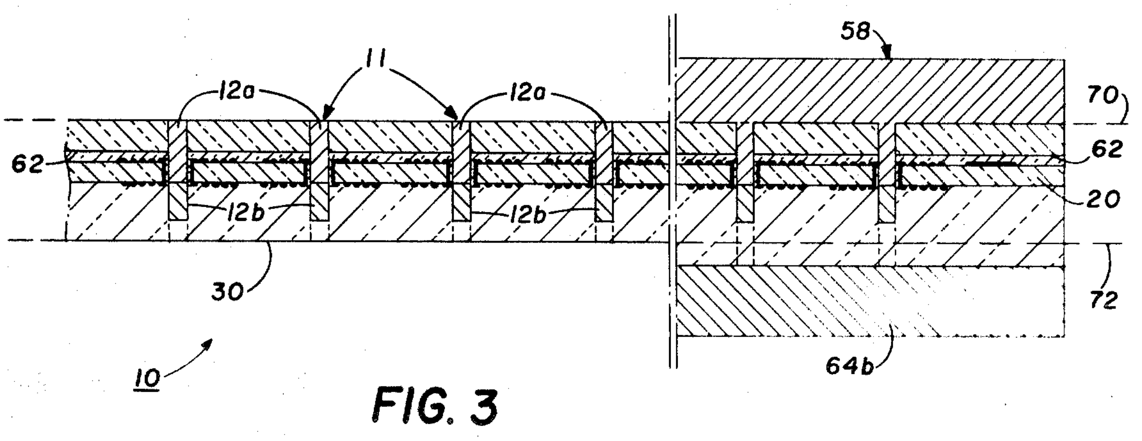
FIG. 3 is a sectional view taken generally on lines 3—3 of FIG. 2, the right-hand portion of the drawing being shown in an intermediate stage of completion.

The array 10 is shown in completed form in the left-hand portions of FIGS. 2 and 3 and at an intermediate stage of manufacture in the right-hand portions. Each read-write head 11 is comprised of a discrete ferrite loop 12 which is generally U-shaped and has a base section 12*a* and leg sections 12*b* and 12*c* the ends of which are spaced apart to provide a gap 14. A pair of coils **16*b* and 16*c* are formed around the legs 12*b* and 12*c* of the loop 12 by patterned metal layers deposited on both sides of a substrate 20. Addressing diodes 22*b* and 22*c* are connected to the coils 16*b* and 16*c*, respectively, as will presently be described. These components are encased in a suitable nonmagnetic and dielectric potting material such as commercially available glass filled epoxy which may be applied in several steps as will hereafter be described in greater detail. The lower face 28 of the array is optically flat and the leading edge 30 is beveled at a slight angle so that the device will float on a thin film of air as a magnetic storage disk is rotated at high speed in the direction of arrow 32 (see FIG. 2) under the lower face 28. Expanded contact pads 34 are provided along the edges of the substrate 20 which protrude from the body of potting material. The contact pads 34 are used to connect the array into the remainder of the read-write circuitry. Other details of the array 10** will become more evident as the process for fabricating the array is described in detail.

Figure 4:
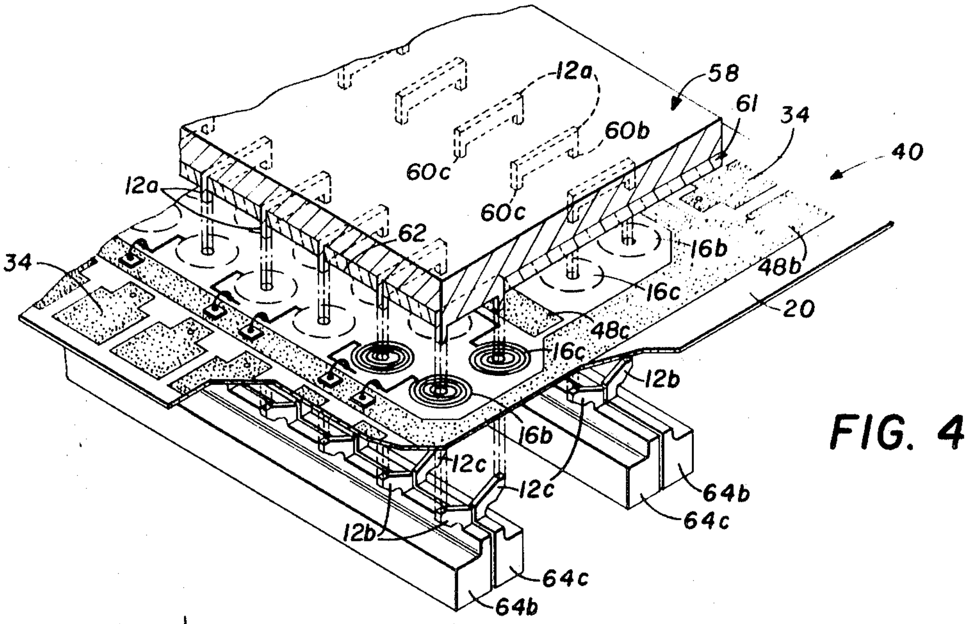
FIG. 4 is an exploded isometric view of the components used to fabricate the device of FIG. 1.

The process for fabricating the array 10 in accordance with this invention will now be described. A coil assembly, indicated generally by the reference numeral 40 in FIG. 4, is fabricated on a substrate 20, which may be either an insulator, such as glass, a high resistivity semiconductor, such as silicon, a selectively reducible material such as YIG (yttrium iron garnet) or $TiO_2$ (titanium dioxide), or other suitable material. The substrate is typically about 8 mils thick and on the order of 1 inch square. The substrate is first thoroughly cleaned, then both sides coated with a thin film of metal by conventional evaporation, sputtering or other vacuum deposition technique. A conventional chromium-gold system may be used for this purpose. Both sides of the substrate are then protected with a photoresist mask while 16 pairs of holes **42*b* and 42*c*, arrayed in two staggered rows of eight pairs each, and 16 feedthrough holes 44 are simultaneously etched through the metal layers and through the substrate from the opposite sides. The metal layers are then stripped from both sides of the substrate and new layers of the same metal reapplied to both sides of the substrate. During the latter deposition, the edges of the holes 42*b*, 42*c* and 44 are also coated with metal so that the metal layers on the opposite faces of the substrate are electrically interconnected. The metal layers on the top face are then patterned as illustrated in FIG. 5, and the bottom face is patterned as illustrated in the partial view of FIG. 6** using conventional photolithographic techniques.

Figure 5:
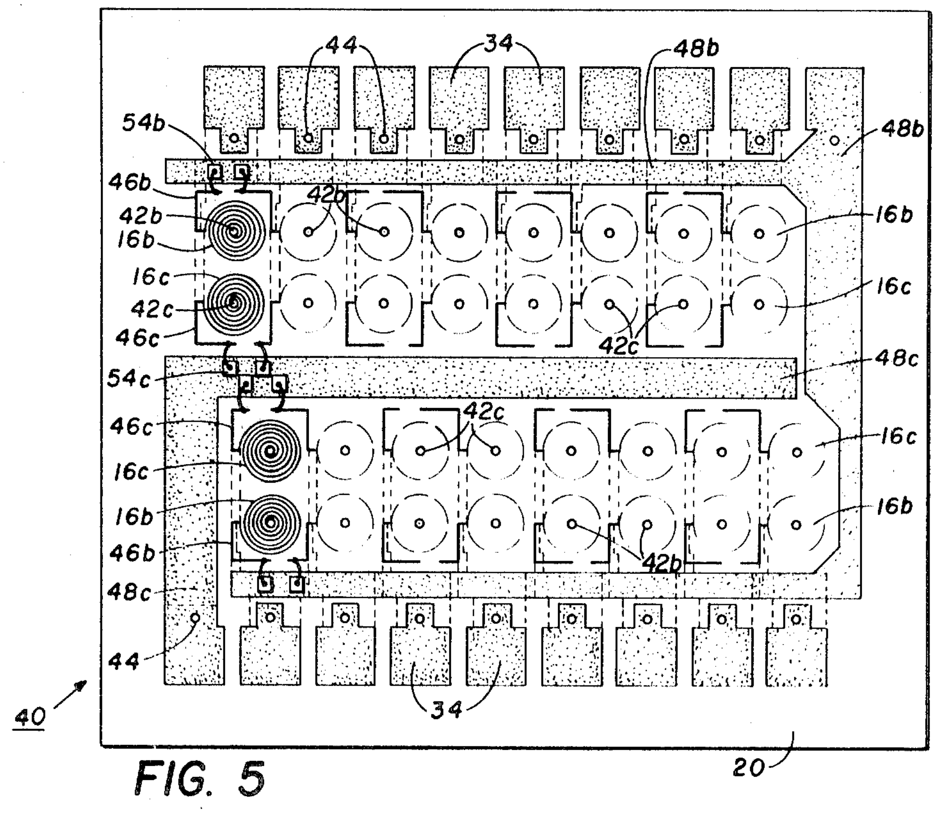
FIG. 5 is a plan view of the top side of the coil assembly of the device of FIG. 1.
Figure 6:
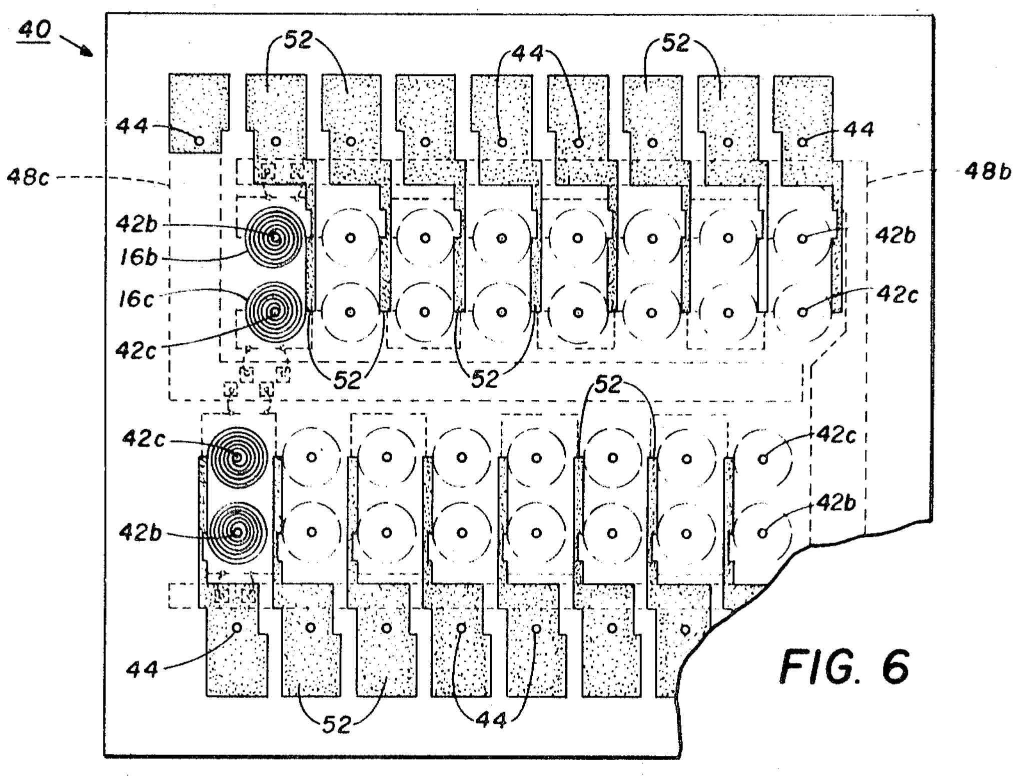
FIG. 6 is a plan view of a portion of the bottom side of the coil assembly of FIG. 4.

As will be noted in FIG. 5, the coils **16*b* and 16*c* are disposed around the openings 42*b* and 42*c*, respectively, and extend outwardly and terminate as conductors 46*b* and 46*c*. A first bus 48*b* has branches which extend along the outside of the two rows of coil pairs. A second bus 48*c* extends from a contact pad at one edge of the substrate 20 and extends between the two rows of coil pairs. The plurality of contact pads 34 are disposed along the edges of the substrate. As will be noted in FIG. 6, the circuitry on the bottom of the substrate 20 includes the other halves of the coils 16*b* and 16*c*, which are in electrical contact with the portions of the coils on the top surface through the openings 42*b* and 42*c*, and conductors 52, which are electrically connected to the expanded contacts 34 on the top face through the apertures 44. A diode 54*b* connects each coil 16*b* to the bus 48*b*. The semiconductor diodes are bonded directly to the bus 48*b*, and are connected to conductor 46*b* by a ball-bonded jumper wire. Similarly, a diode 54*c* connects each coil 16*c* to the bus 48*c***.

Figure 7:
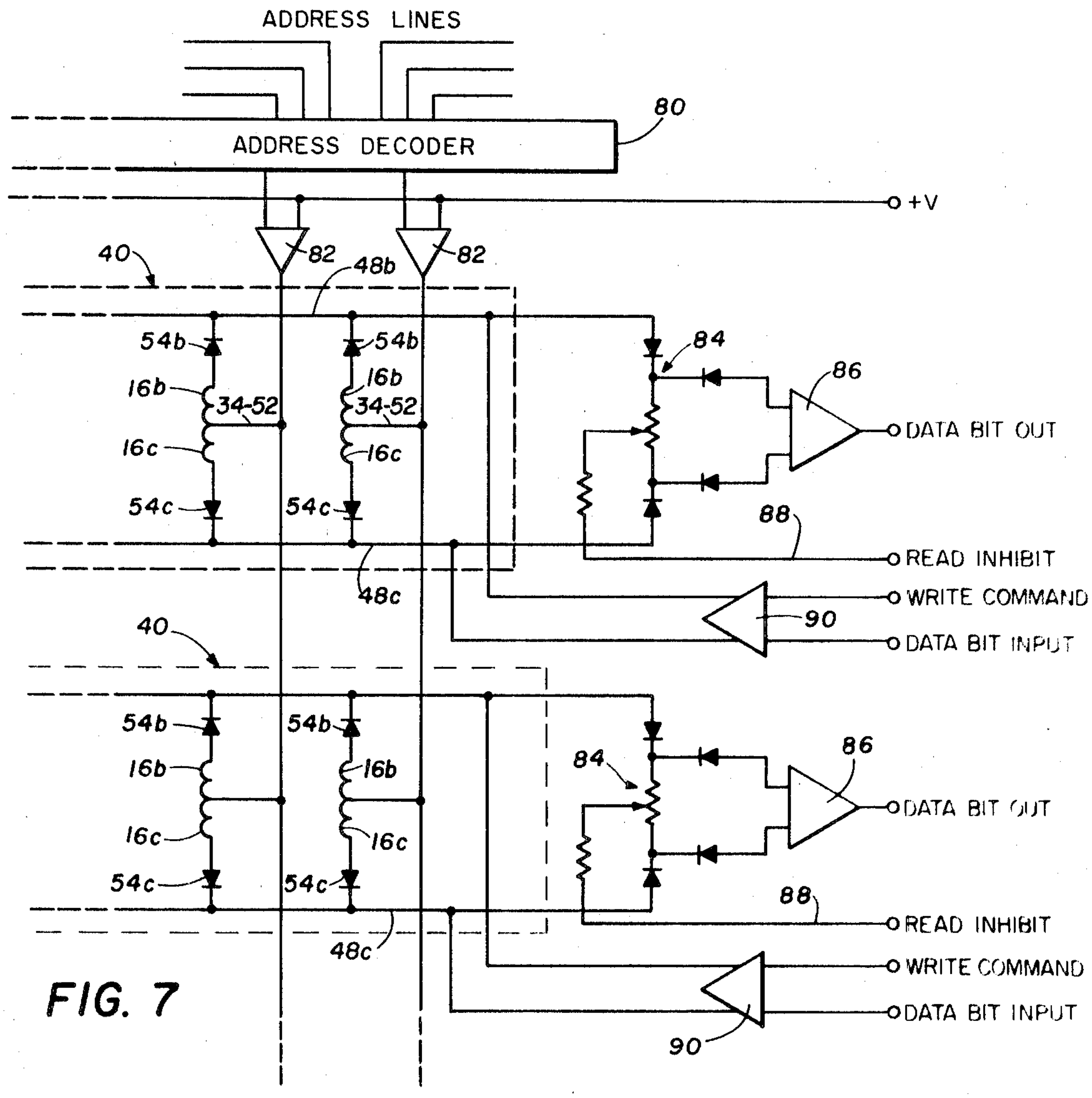
FIG. 7 is a schematic circuit diagram illustrating how the array of FIG. 1 may be utilized.

The equivalent circuit is illustrated schematically in FIG. 7 where corresponding parts are designated by corresponding reference characters. The portion of the circuit included in the coil assembly 40 is indicated by the dotted outline 40 in FIG. 7. The circuit extending from contact pads 34 on the top surface through the apertures 44 to the conductor 52 on the bottom surface forms a center tap which is connected between the coils **16*b* and 16*c*, each of which is formed half on the bottom surface and half on the top surface as previously described. The circuit continues through diodes 54*b* and 54*c* to the common buses 48*b* and 48*c*, respectively. Operation of the circuit shown in FIG. 7** is hereafter described in greater detail.

An upper ferrite subassembly, indicated generally by the reference numeral 58 in FIGS. 2–4, is machined from a ferrite block so as to leave 16 base portions **12*a* protruding from the lower face. Each of the base portions 12*a* includes a pair of stubs 60*b* and 60*c* which have a length approximately equal to the thickness of the coil assembly 40. A layer 61 of nonmagnetic and dielectric material, such as glass filled epoxy, covers the lower surface of the ferrite block. The layer 61 may be applied after the base portions 12*a* are formed by machining cross channels in the lower face of the ferrite body 58. Then both the layer 61 and the ferrite body can be simultaneously machined to leave stubs 60*b* and 60*c***.

A pair of identical ferrite parts **64*b* and a pair of identical ferrite parts 64*c* are then machined as illustrated in FIGS. 2–4. It will be noted that leg portions 12*b* extend upwardly from parts 64*b* and legs 12*c* extend upwardly from parts 64*c*. A part 64*b* is then paired with a part 64*c*, separated only by a thin layer of nonmagnetic material, to form a gap 14. The gap 14 is typically about 25,000 angstroms thick. The thin layer of nonmagnetic material may be used to bond the two ferrite parts 64*b* and 64*c* together, or the ferrite parts can be bonded together by a material at points other than the points where the gaps 14** are to be formed.

The upper ferrite subassembly 58 may then be laid on a flat surface with stubs **60*b* and 60*c* projecting upwardly. The face 62 of the layer 61 of dielectric material can then be coated with a suitable conventional dielectric and nonmagnetic bonding material, such as glass filled epoxy, and the coil assembly 40 inverted and placed such that the stubs 60*b* and 60*c* project through the respective apertures 42*b* and 42*c*. The bottom face of the coil assembly 40, which may conveniently be facing upwardly for this step, is then coated with the bonding material and the assembled pairs 64*b* and 64*c* positioned such that the ends of the legs 12*b* and 12*c* abut against the ends of the stubs 60*b* and 60*c***, respectively, in the respective rows.

After the dielectric bonding material has hardened, the structure is substantially as illustrated in the right-hand sections of FIGS. 2 and 3 wherein the bonding material used to connect the upper ferrite subassembly 58 to the top face of the substrate is indicated by the reference numeral 66, and the bonding material used to connect the assembled pairs **64*b* and 64*c* to the bottom face of the substrate is indicated by the reference numeral 68. After the bonding material has hardened, the excess portion of the upper ferrite subassembly 58 is removed along dotted line 70, and the excess portions of parts 64*b* and 64*c* and the bonding material 68 are removed along dotted line 72 to form the lower face 28 which is the lapped and polished optically flat. The leading edge 30** is then beveled to complete the structure.

In accordance with another aspect of the invention, the substrate 20 of the coil assembly 40 may be a high resistivity semiconductor material. In that case, the diodes **54*b* and 54*c*, and also the coils 16*b* and 16*c* if desired, may be formed in the semiconductor substrate by a conventional double diffusion process, and then interconnected in the control circuit for the respective coils by appropriately patterning the metal layers. The substrate for the coil assembly may also be a selectively reducible material such as yttrium iron garnet (YIG) or titanium dioxide ($TiO_2$), which may be reduced in selected areas from a nonconductive material to a conductive material by a scanned beam of energy such as an electron beam. Or the substrate upon which the coils are formed may be a flexible plastic material such as H-film which is polypyromellitimide plastic sold under the trademark Kapton by DuPont, or other suitable material. The use of a separate semiconductor substrate provides the advantage of utilizing a coil on both faces of the substrate, thus giving a maximum number of turns for a given line width, in a given area. If desired, the upper ferrite subassembly 58 may be used as the substrate, in which case the coils can be formed directly on the lower face of the assembly 58. Conversely, the legs 12*b* and 12*c* can be incorporated into a lower substrate assembly and the coils formed on the upper surface of that assembly. Or, coils can be formed on the faces of both the upper and lower assemblies, and separated by a thin layer of insulation with electrical feed-through, as required, after assembly. The stubs 60*b* and 60*c* which extend through the coils may project from either the upper ferrite subassembly 58 or from the leg portions 12*b* and 12*c* of the lower substrate assembly. The stubs 60*b* and 60*c* may also be formed by a patterned layer of magnetic material, such as a photoresist filled with ferrite powder. Also, the stubs 60*b* and 60*c*** may be formed by chemical etching, sandblasting, or techniques other than machining.

A plurality of arrays 10 can be operated by the control circuitry illustrated in FIG. 7, where the portion of the circuitry on each coil assembly 40 is defined by the dotted line 40. An address decoder 80 operates one of the drivers 82 so as to supply current through the center tap 34–52 to forward bias the diodes **54*b* and 54*c* and enable one read-write head on each array in the system. The voltage induced in the coils 16*b* and 16*c* of the enabled head of a particular array can then be read through the diode-switching matrix 84 and differential amplifier 86 which is selected by switching the logic control line 88 to a low potential. Similarly, any one of the heads enabled by current from a driver 82 can be used for writing by actuating the corresponding write amplifier 90**. The circuitry for operating the arrays is of conventional design and does not constitute a part of this invention.

Figure 8:
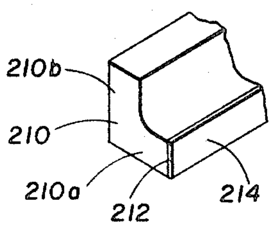
FIGS. 8–13 are simplified isometric views which illustrate the steps of another method for fabricating a read-write array in accordance with the present invention.

Another method for fabricating an array of read-write heads in accordance with the present invention is illustrated in FIGS. 8–13. A ferrite piece 210 is machined as illustrated in FIG. 8. The ferrite piece 210 has a base portion **210*a*, an upstanding flange portion 210*b*, and a very flat face 212 extending along one edge of the base portion. The edge 212 is then coated with a thin highly uniform layer of nonmagnetic material 214, such as glass. The nonmagnetic layer 214** is typically about 12,500 angstroms thick, and may be deposited using a conventional vacuum deposition process such as RF sputtering.

Figure 9:
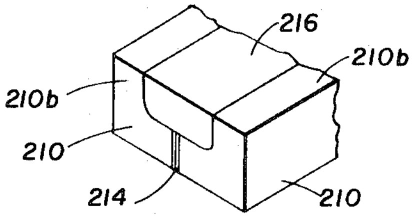

The piece 210 is then cut in half and the opposite halves mated as illustrated in FIG. 9 so that the nonmagnetic layers 214 are in abutting relationship. The two pieces 210 are then bonded together by a suitable nonmagnetic material 216 deposited in the trough formed between the flange portions **210*b*. The nonmagnetic material 216** may be a glass-filled epoxy.

Figure 10:
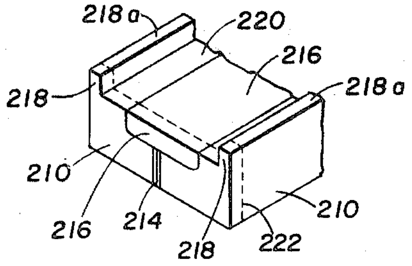

Next, a slot is machined in the assembly illustrated in FIG. 9 to produce the assembly as illustrated in FIG. 10. It will be noted in FIG. 10 that the flange portions **210*b* have been substantially reduced in width to leave flanges 218 which protrude above a face 220 which extends across the nonmagnetic material 216. The upper faces 218*a* of the flanges 218 are preferably very flat and parallel to the face 220**.

Figure 11:
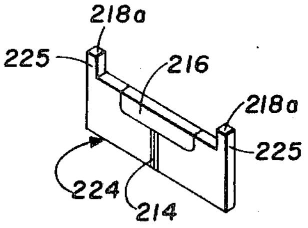
Figure 12:
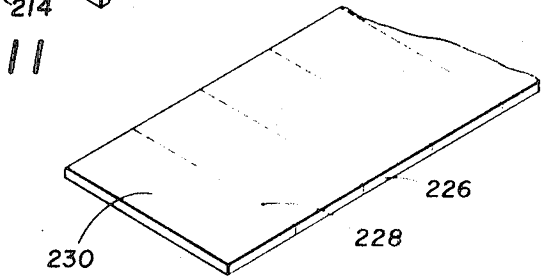

The assembly of FIG. 10 is then sliced along dotted line 222 to provide a final part 224 illustrated in FIG. 11 having upwardly projecting posts 225 with flat top surfaces **218*a*. The part 224 constitutes the half of a magnetic loop for a read-write head that contains the nonmagnetic sensing gap, which is formed by the nonmagnetic layers 214. The other half of each magnetic loop is comprised merely of a small piece of ferrite material which is sized to bridge between the surfaces 218*a* of the loop half 224 and which may be comprised by slicing a thin sheet of ferrite material 226, as illustrated in FIG. 12, along dotted lines 228 to provide the upper loop halves 230**.

Figure 13:
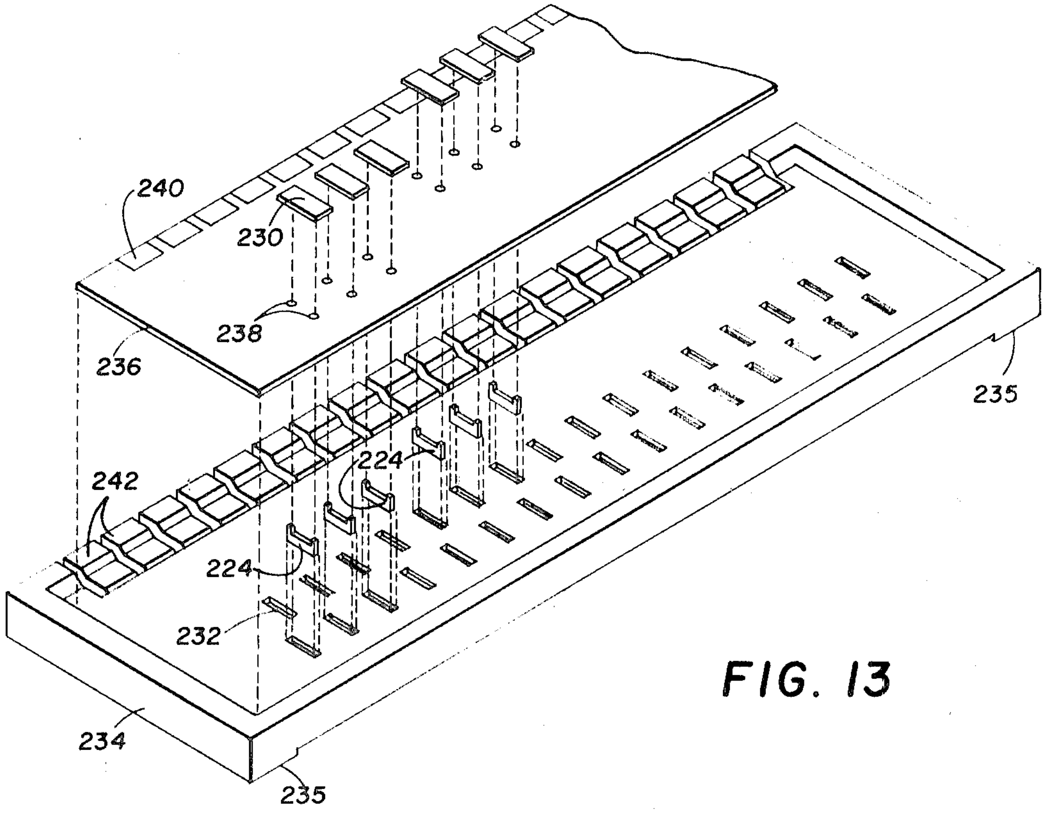

The magnetic loops may then be assembled into an array of read-write heads as illustrated in the exploded isometric view of FIG. 13. The lower magnetic loop halves 224 may be placed into slots 232 in a ceramic housing 234 and may rest on a highly planar reference surface which also supports the housing 234. The housing 234 has a pair of flat surfaces 235 which ride on a thin film of air between the magnetic recording media and the array to support the array. A coil assembly 236, which may be very similar to the coil assembly 40 of FIG. 4, is then placed over the lower loop halves 224 with the posts 218 projecting through apertures 238. The upper magnetic loop halves 230 may then be placed in position on the upper surfaces **218*a* of the respective lower loop halves. The expanded metallized contacts 240 on the coil assembly 236 may then be connected to contact pads represented at 242 on the housing 234** using any suitable conventional technique, such as ball-bonded jumper wires. The entire assembly may then be filled with a suitable nonmagnetic and dielectric liquid potting material to hold the various parts in place and provide a solid structure.

If desired, the procedure for assembling the array in FIG. 13 can be reversed. For example, the upper magnetic loop halves 230 can be placed in a suitable holder, the coil assembly 236 inverted and placed on the upper loop halves 230, the lower loop halves 224 then placed in position in the respective apertures 238 of the coil assembly, and finally a lower housing placed around the coil assembly 236 to form the sidewalls of a receptacle for receiving the liquid potting compound and the flying pads. The liquid potting compound would then be poured into the receptacle to provide a completely solid structure.

Figures 14, 15, 16, 17, 18, 19, 20, 21:
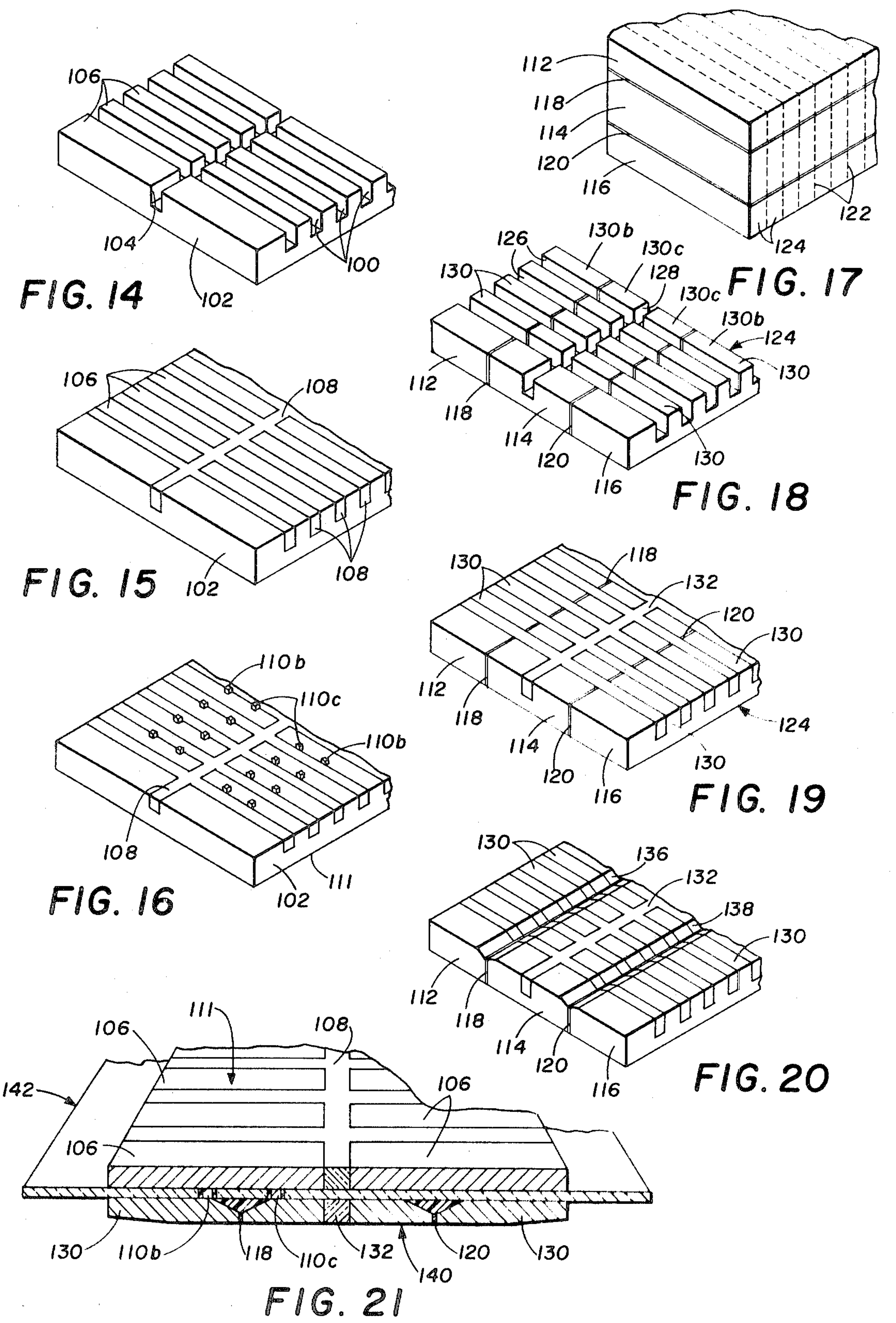
FIGS. 14–16 are schematic isometric views illustrating a process for fabricating an upper assembly in accordance with the present invention.
FIGS. 17–20 are schematic isometric views illustrating the process in accordance with the present invention for fabricating a lower assembly.
FIG. 21 is a simplified sectional view of an array of magnetic read-write heads formed using the upper and lower assemblies as illustrated in FIGS. 16 and 19.

Another method for fabricating an upper assembly is illustrated in FIGS. 14–16. A number of parallel grooves 100 are cut in the face of a ferrite block 102. This may be accomplished using a diamond saw of the type conventionally used to slice semiconductor material. A center groove 104 is then cut to the same depth in the direction normal to the parallel grooves 100 to leave a series of ferrite mesas 106 projecting upwardly from the ferrite block 102, substantially as shown in FIG. 14.

The grooves 100 and 104 are then filled with a nonmagnetic material 108 as illustrated in FIG. 15. The nonmagnetic material 108 may be glass-filled epoxy, glass, or any other suitable nonmagnetic and dielectric material. It will be noted that each of the ferrite mesas 106 is magnetically isolated from each of the other ferrite mesas by the nonmagnetic material 108, except for the path through the ferrite block 102. The nonmagnetic material 108 is preferably a material which is mechanically strong and forms a good mechanical bond with the ferrite so that the structure illustrated in FIG. 15 can be machined without danger of breaking the ferrite mesas.

The top surface of the structure shown in FIG. 15 is then machined to leave a pair of posts **110*b* and 110*c* projecting upwardly from each mesa 106. Each mesa 106 with the posts 110*b* and 110*c* then corresponds to the base portion 12*a* in the upper assembly shown in FIGS. 2–4, while the posts 110*b* and 110*c* correspond to the posts 60*b* and 60*c*. This results in an upper assembly indicated generally by the reference numeral 111** in FIG. 16.

The lower assembly may be fabricated using the process illustrated in FIGS. 17–20. Three separate ferrite slabs 112, 114 and 116 are bonded together by very thin layers of nonmagnetic material 118 and 120. The layers of nonmagnetic material 118 and 120 have a thickness corresponding to the desired width of the sensing gap in the ferrite loops. The center ferrite slab 114 has a width corresponding to the spacing between the sensing gaps in the rows of magnetic loops. The nonmagnetic layers 118 and 120 are typically only about 25,000 angstroms thick, and any variations in this thickness will affect the performance of the array of read-write heads. Accordingly, the opposite faces of the center slab 114 should be very flat and parallel, while the mating faces of slabs 112 and 116 should also be flat.

The nonmagnetic layer between the center ferrite slab 114 and the two outer ferrite slabs 112 and 116 may be produced by depositing the nonmagnetic material on the face of one or both slabs, to the desired thickness using a vacuum deposition technique, then using the nonmagnetic material to bond the ferrite slabs together. For example, glass may be RF sputtered onto the face of one of the slabs using conventional RF sputtering techniques. Such techniques permit the precise control of the thickness of the deposited layer, and also results in a layer of uniform thickness which strongly adheres to the ferrite. The second ferrite slab is then placed against the glass layer and the glass layer heated to its softening point so that the glass bonds to the ferrite.

After the three slabs 112, 114 and 116 are bonded together, the laminated structure is sliced normal to the laminate as illustrated by dotted lines 122 to produce a plurality of ferrite blocks 124, each suitable for fabricating a lower assembly as will now be described.

A plurality of parallel grooves 126 are then cut in the face of a block 124 in a direction normal to the bonding layers 118 and 120, and a center groove 128 is cut between the bonding layers 118 and 120. This leaves a plurality of ferrite mesas 130 each of which is formed of two ferrite parts **130*b* and 130*c* separated by the layers 118 and 120 of nonmagnetic material. The grooves 126 and 128 are then filled with a suitable nonmagnetic material 132, such as glass filled epoxy, or glass, or organic adhesive, as illustrated in FIG. 19. The top face 134 (see FIG. 20) of the block 124 is then ground and polished very flat and a pair of V-grooves 136 and 138 cut to a predetermined depth below the surface 134 along the nonmagnetic layers 118 and 120. This results in a lower assembly indicated generally by the reference numeral 140 in FIG. 20**.

The upper assembly 111 shown in FIG. 16 and the lower assembly 140 shown in FIG. 20 are then bonded to opposite sides of a coil assembly, indicated generally by the reference numeral 142 in FIG. 21. The mesas 106 of the upper assembly 111 and the mesas 130 of the lower assembly 140 are then separated from the ferrite blocks, using a diamond saw for example, so that each completed ferrite loop is magnetically isolated from the other by the nonmagnetic material 108 and 132 deposited in the respective grooves.

Figure 22:
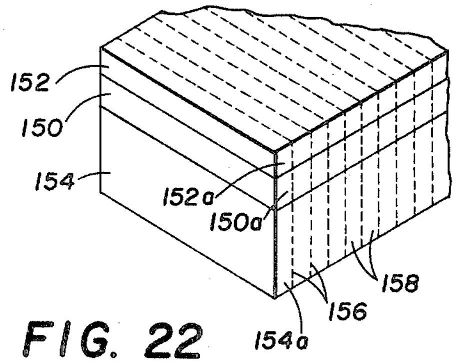
FIGS. 22–24 are schematic isometric views illustrating another process for fabricating the upper assembly.
Figure 23:
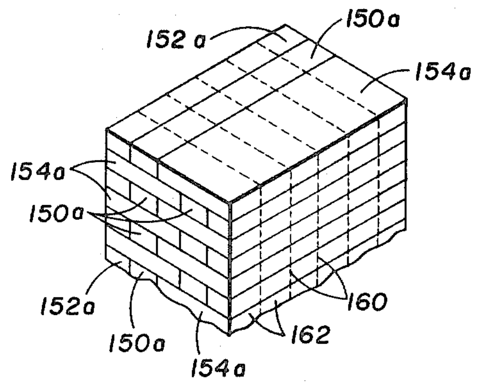
Figure 24:
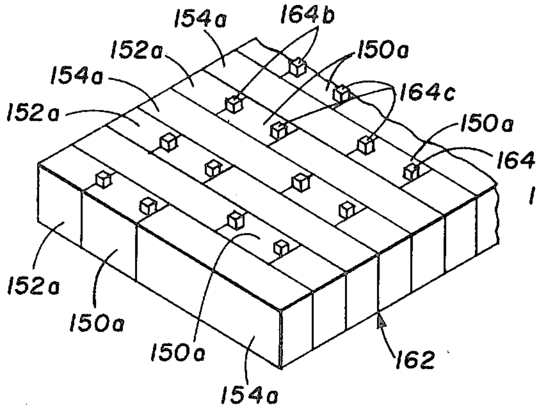

Another process in accordance with the present invention for fabricating the upper ferrite assembly is illustrated in FIGS. 22–24. A ferrite slab 150 is bonded between a pair of nonmagnetic slabs 152 and 154 as illustrated in FIG. 22. The laminated structure is then sliced along the dotted lines 156 to produce a plurality of slices 158, each slice being comprised of a strip of ferrite **150*a* sandwiched between strips of nonmagnetic material 152*a* and 154*a*. Alternate slices 158 are then reversed to provide a stack s as shown in FIG. 23 and the slices bonded together with a suitable material such as an epoxy. This results in a structure in which each ferrite strip 150*a* is isolated from each of the other ferrite strips 150*a* by the nonmagnetic strips 154*a*. The laminated structure of FIG. 23 is then sliced normal to the slices 158 as represented by the dotted lines 160 to form a plurality of laminated assemblies 162, each of which can used to fabricate an upper assembly. One face of the assembly 162 is then machined to leave stubs 164*b* and 164*c* on each ferrite strip 150*a***.

Figure 25:
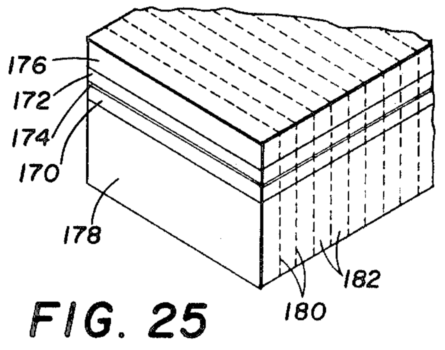
FIGS. 25–27 are schematic isometric views illustrating another process for fabricating the lower assembly.
Figure 26:
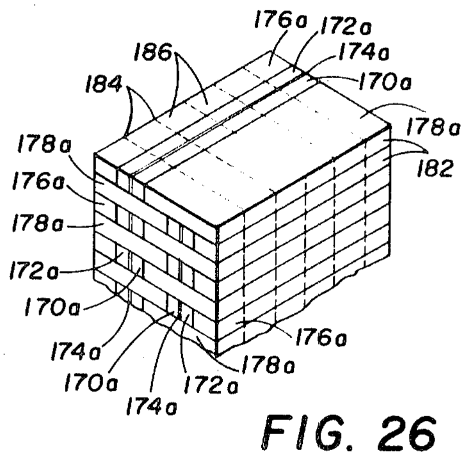
Figure 27:
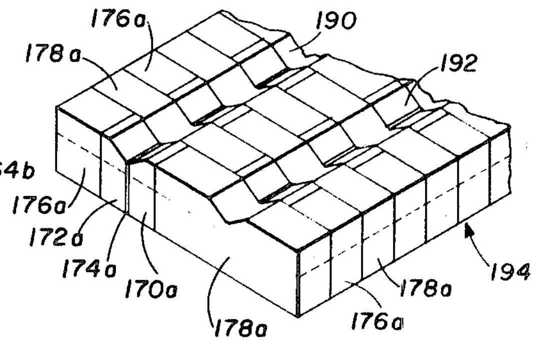

The lower assembly may be fabricated by the process illustrated in FIGS. 25–27. A pair of of ferrite slabs 170 and 172 are bonded together by a thin layer of nonmagnetic material 174, such as glass. The adjacent faces of the ferrite slabs 170 and 172 are ground very flat and the nonmagnetic bonding layer 174 is of uniform thickness as heretofore described in order to provide uniform gaps for the magnetic loops. The ferrite slabs 170 and 172 are then bonded between nonmagnetic slabs 176 and 178 to produce the laminated structure illustrated in FIG. 25 which is then sliced along planes normal to the interfaces between the slabs as represented by the dotted lines 180, thus producing slices 182. Each slice 182 is then comprised of ferrite strips **170*a* and 172*a* which are separated by a thin nonmagnetic strip 174*a*, and which lie between nonmagnetic strips 176*a* and 178*a*. Alternate slices 182 are then reversed and bonded into the stack illustrated in FIG. 26 which is then sliced normal to the slices 182, along the planes represented by the dotted lines 184, to provide a plurality of structures 186, each of which may be used to fabricate a lower ferrite assembly. One face 188 of the slice 186 is then ground substantially flat and a pair of grooves 190 and 192 cut to a predetermined depth in the face along the nonmagnetic strips 174*a* to complete fabrication of the lower assembly, which is indicated generally by the reference numeral 194**.

The upper assembly 162 and the lower assembly 194 are then bonded on opposite sides of a coil assembly 196, which may be identical in construction with the coil assembly 40. The lower face 198 of the lower assembly 194 is then machined, ground, and polished optically flat, and the leading edge 200 beveled to complete the structure.

Figures 28, 29:
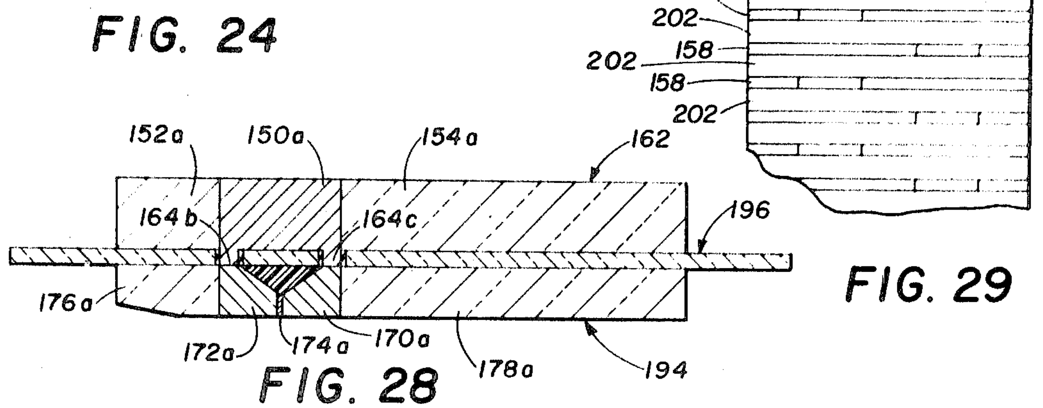
FIG. 28 is a simplified sectional view illustrating an array of magnetic read-write heads constructed utilizing the upper and lower ferrite assemblies of FIGS. 24 and 27.
FIG. 29 is a simplified schematic drawing which illustrates an alternative embodiment of this invention.

Alternatively, either or both of the upper and lower assemblies 162 and 194 a can be fabricated as illustrated in the schematic plan view of FIG. 29 using the same basic process illustrated in FIGS. 22–24 or 25–27. The upper assembly 162 is chosen for purposes of illustration. The laminated structure of FIG. 22 is prepared as previously described. However, the slices 158 are made only as thick as the posts **164*b* and 164*c*. The alternate slices 158 are reversed as illustrated in FIG. 23 except that the slices are separated by slices 202 of nonmagnetic material having a thickness equal to the spacing between adjacent magnetic loops as illustrated in FIG. 29. The laminated structure of FIG. 29 can then be machined or otherwise prepared as illustrated in FIG. 24**. The lower assembly can be modified in the same manner.

Although preferred embodiments of the invention have been described in detail it is to be understood that various changes, substitutions, and alterations can be made therein without departing from the spirit and scope of the invention as defined by the appended claims.

What I claim is:

1. In a method for fabricating an array of magnetic read-write heads each comprised of a magnetic loop with a flux-sensing gap and a coil individually coupled to the magnetic loop, the steps of:
   - bonding at least one layer of ferrite to at least one layer of nonmagnetic material,
   - slicing said at least one ferrite layer normal to said nonmagnetic layer to form a first plurality of slices each having a strip of ferrite material and a strip of nonmagnetic material,
   - reversing alternate of said slices, and bonding said slices together thereby forming a first structure in which each of said strips of magnetic material are separated from each other by a strip of nonmagnetic material,
   - slicing said first structure normal to said magnetic strip to form a second plurality of laminated assemblies, and
   - machining at least one surface of said assemblies to form a plurality of ferrite stubs, said stubs protruding from a substantially flat surface.

2. The method defined in claim 1 wherein there is one layer of ferrite bonded between two layers of nonmagnetic material.

3. The method defined in claim 1 wherein there are two layers of ferrite bonded together by a layer of nonmagnetic material having a thickness corresponding to the width of the flux sensing gap of the magnetic loops.

4. The method defined in claim 3 wherein each of the layers of ferrite is also bonded to another layer of nonmagnetic material.

5. The method defined in claim 1 wherein at least two of the slices are bonded together by a slice of nonmagnetic material.